Nov. 3, 1964   F. W. CULPEPPER, JR   3,154,862
EDUCATIONAL DEVICE
Filed Nov. 30, 1962   4 Sheets-Sheet 1

Fred W. Culpepper, Jr.
INVENTOR.

BY Koenig, Pope, Senniger and Powers,
Attorneys.

Nov. 3, 1964    F. W. CULPEPPER, JR    3,154,862
EDUCATIONAL DEVICE

Filed Nov. 30, 1962    4 Sheets-Sheet 2

Nov. 3, 1964  F. W. CULPEPPER, JR  3,154,862
EDUCATIONAL DEVICE

Filed Nov. 30, 1962  4 Sheets-Sheet 3

United States Patent Office 3,154,862
Patented Nov. 3, 1964

3,154,862
EDUCATIONAL DEVICE
Fred W. Culpepper, Jr., Norfolk, Va., assignor to Southern Illinois University Foundation, Carbondale, Ill., a corporation of Illinois
Filed Nov. 30, 1962, Ser. No. 241,300
22 Claims. (Cl. 35—9)

This invention relates to an educational device, and more particularly to a teaching machine which provides both teaching and testing functions.

Among the several objects of this invention may be noted the provision of a teaching machine which may be operated by a student to provide both teaching and testing functions; the provision of such a machine in which the teaching and testing functions are interrelated so that the learning process is reinforced by repetition; the provision of an educational device which is quite flexible in application and which may be employed in any field in which matching type tests are possible; the provision of a teaching aid in which the subject matter to be taught may be readily and economically varied; the provision of such a teaching machine which is easy to operate and which may be programmed by nontechnical personnel; the provision of a teaching machine which is of inexpensive construction and easily assembled and which is therefore within the financial reach of most schools; and the provision of such a teaching machine which is rugged and reliable in operation. Other objects and features will be in part apparent and in part pointed out hereinafter.

Essentially, the invention is directed to a teaching machine which includes a panel having thereon a first series of representations of items to be taught, a second series of representations in explanation of the items of the first series and visually coded therewith, and a third series of representations corresponding to the second series but presented visually at random relative to the first and second series. In the specific embodiment disclosed herein, the first series of representations is a group of electronic symbols, and the second and third series of representations each name or explain the respective symbols of the first series. The representations of the second series are positioned with respect to the first series so that an explanation of each symbol is located immediately adjacent each symbol. The teaching machine further comprises masking means, for example a shutter, shiftable by a student-operator between a teaching or learn position wherein the first and second series of representations are exposed and the third series is masked, and a response or testing position wherein the first and third series of representations are exposed and the second series is masked. Also provided are a plurality of switches, one associated with each representation of the third series, and means programmed in accordance with the sequence of representations in said third series relative to the sequence of representations in said first series and operative when the masking means is in its response or testing position for indicating whether the switches are actuated by the student-operator in a sequence which correctly matches the representations of the first series with the representations of the third series or whether these switches are actuated in some other sequence.

The invention accordingly comprises the constructions hereinafter described, the scope of the invention being indicated in the following claims:

In the accompanying drawings in which one of various possible embodiments of the invention is illustrated, FIG. 1 is a trimetric view of one exemplary embodiment of a teaching machine constructed in accordance with the present invention;

Corresponding reference characters indicate corresponding parts throughout the drawings.

Figures 1, 2, 5:
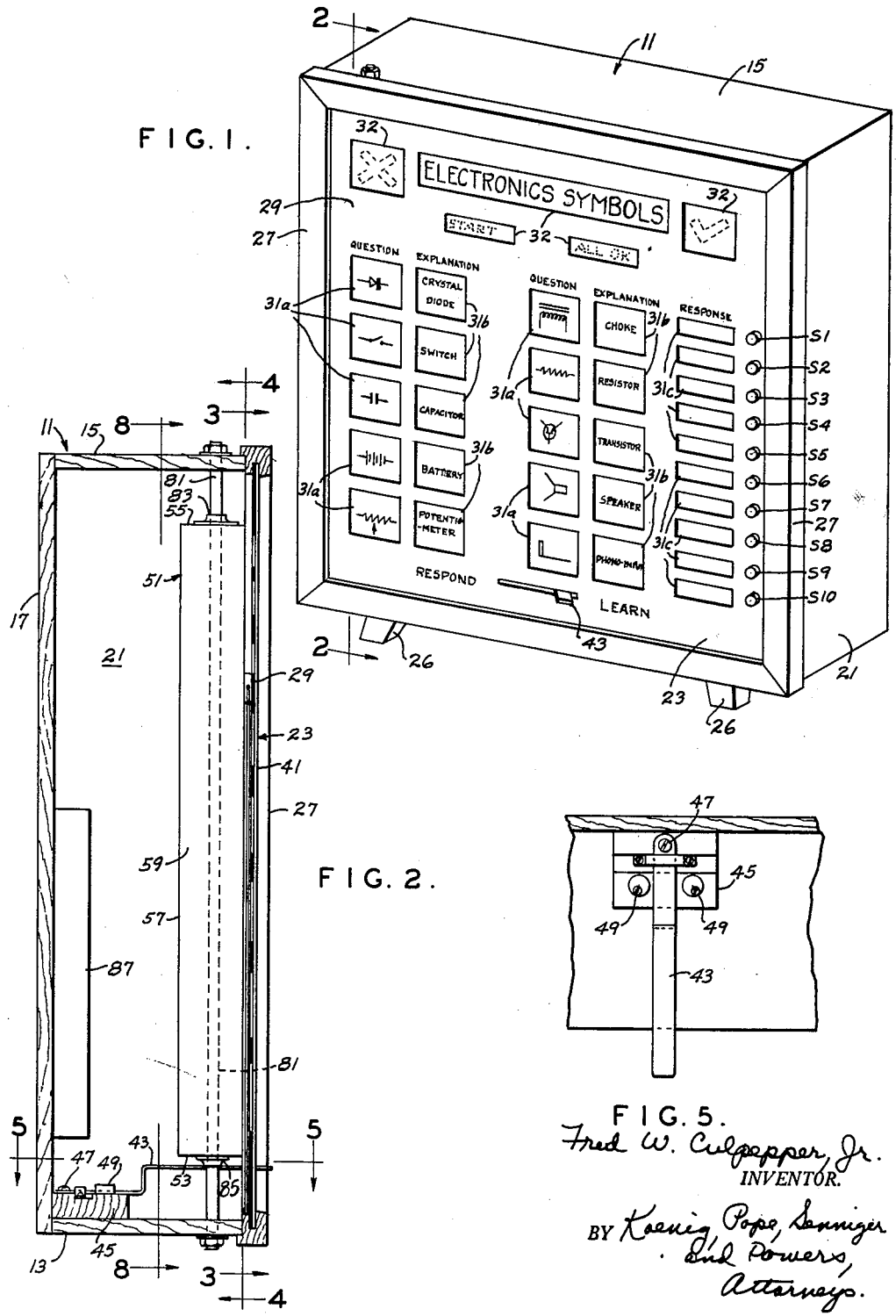
FIG. 2 is a cross section of this teaching machine taken on line 2—2 of FIG. 1.
FIG. 5 is a top view of the control lever illustrated in FIG. 2 taken on line 5—5 of FIG. 2.

Referring now to the drawings, a teaching machine constructed in accordance with this invention is shown to comprise a housing or cabinet designated in its entirety by reference numeral 11. More particularly, the cabinet comprises a bottom wall 13, a top wall 15, a back wall 17, side walls 19 and 21, and a front panel 23. Walls 13, 15, 17 and 19 are illustrated as being made of wood. Panel 23 is secured to the front edge of side wall 21 by a hinge 25, and may be pivoted about this hinge to provide access to the interior of housing 11. A latch (not shown) is provided to normally hold panel 23 in its closed position. Housing 11 is supported by four legs 26.

Figure 3:
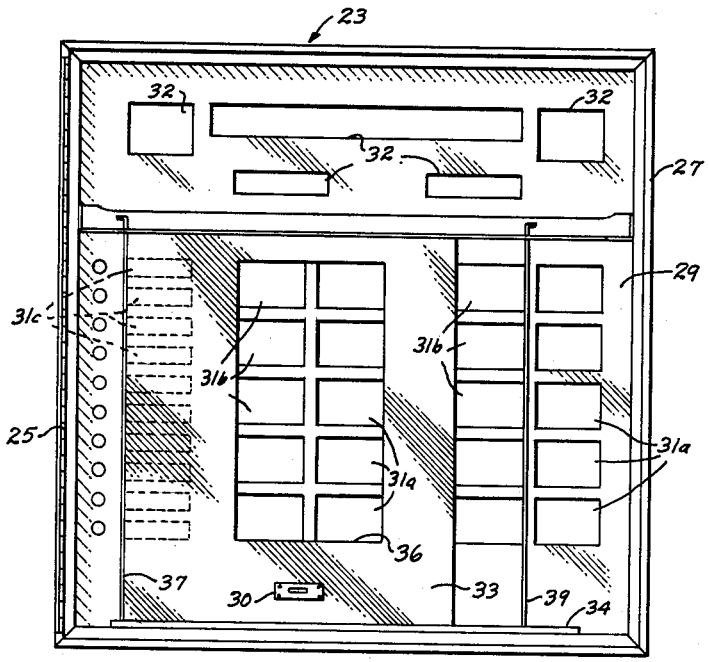
FIG. 3 is a view of the inner face of the front panel of this machine taken on line 3—3 of FIG. 2.

Panel 23 includes a wooden frame member 27 which holds a piece of opaque material, for example, a piece of Masonite 29, having three series or patterns of openings or apertures therein. These are indicated respectively at 31a, 31b and 31c. Member 29 also has five apertures therein at the top; these are indicated at 32. A second opaque member 33 which constitutes a shutter or masking member is slideably supported by an L-brace 34 and a guide member 35 both secured to frame member 27. Member 33 is a generally rectangular panel of opaque material, such as Masonite, having a rectangular opening 36 therein. A pair of rods 37 and 39, secured between brace 34 and guide member 35, limit the movement of panel 33 between the position illustrated in FIG. 3 and a position wherein the right edge of panel 33 (as viewed in FIG. 3) contacts rod 39. A piece of glass 41 is provided and held by frame member 27 adjacent the outer surface or face of opaque member 29.

A plurality of push-button type switches S1–S10 are mounted on board 29 and extend through glass plate 41. One of these switches is positioned immediately adjacent each of apertures 31c.

A control lever 43, secured at one end to a block 45 in the bottom of housing 11, provides a means of positioning shutter 33. This lever is pivoted about a screw 47 between two stops 49. The other end of lever 43 is carried through a slot in shutter 33 and then through elongate and coextensive slots in panel 29 and glass 41. A small metal plate 30 fastened to shutter 33 outlines the slot therein. The positioning of lever 43 determines the position of shutter 33 which in turn controls which of the windows or apertures 31b and 31c in plate 29 are masked by this shutter. Thus, in the position of shutter 33 illustrated in FIG. 3, apertures 31a and 31b are uncovered and apertures 31c are masked; with shutter 33 positioned in contact with rod 39, openings 31a and 31c are uncovered and openings 31b are masked.

Figure 7:
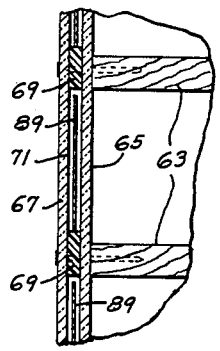
FIG. 7 is an enlarged cross section of this inner panel taken on line 7—7 in FIG. 4.
Figure 4:
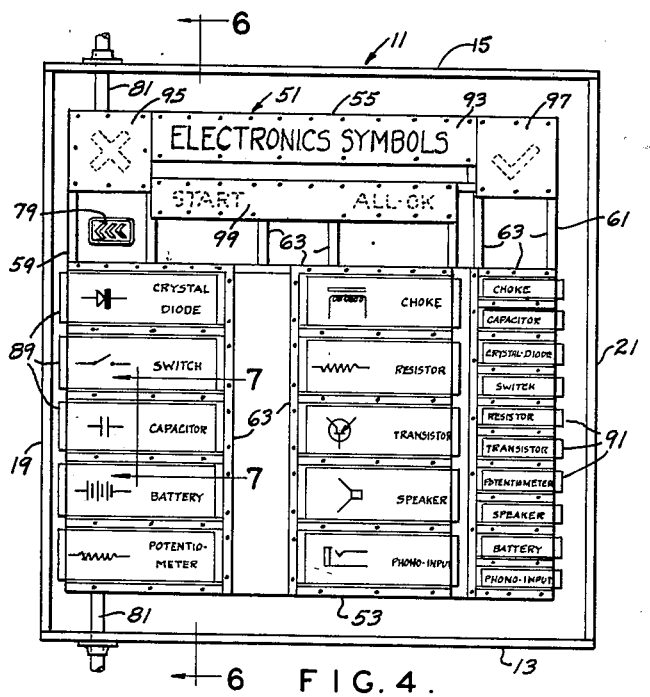
FIG. 4 is a view of the inner panel of this machine taken on line 4—4 of FIG. 2.
Figure 6:
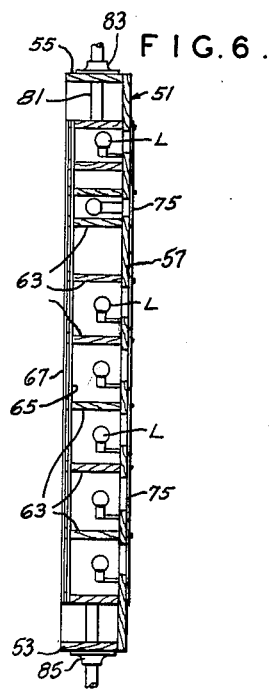
FIG. 6 is a cross section of the inner panel illustrated in FIG. 4 taken on line 6—6 of FIG. 4.
Figure 9:
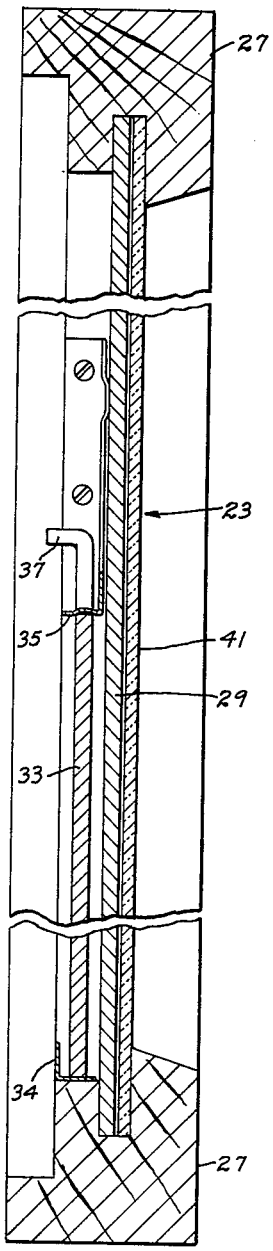
FIG. 9 is an enlarged cross section of the front panel of the FIG. 1 teaching machine.
Figure 8:
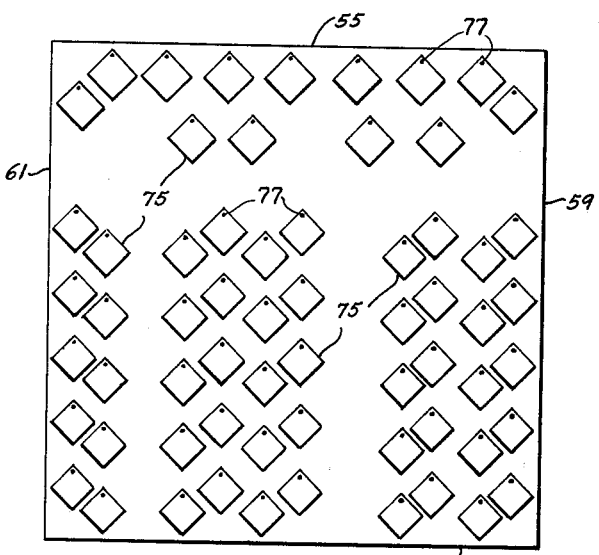
FIG. 8 is a view of the back of the inner panel taken on line 8—8 of FIG. 2.

Positioned within housing 11 is an inner panel or housing indicated generally by reference numeral 51. This housing has a bottom wall 53, a top wall 55, a back wall 57, and side walls 59 and 61. A plurality of partitions 63 within housing 51 divide the space therein into a plurality of cells. Sheets of semi-transparent or translucent plastic material 65, tacked to the front edges of partitions 63 enclose various of these cells. Layers of transparent material 67 are in turn secured to the front edges of partitions 63, spaced from sheets 65 by strips of plastic 69, providing a plurality of pockets 71 (see FIG. 7). As explained hereinafter, these pockets receive slips of tracing paper or acetate film which constitute translucent cards which carry the appropriate representations or indicia to be presented during the operation of the teaching machine. A plurality of incandescent lamps L are provided, positioned within the enclosed cells, and the back wall 57 of housing 51 has a plurality of openings therein, one behind each of these incandescent lamps. These openings are covered by metal plates 75 which may be pivoted about pins 77 by which they are secured to wall 57 to provide access to the lamps within the various cells (see FIG. 8). A buzzer indicated at 79 is mounted within one of the cells.

Inner panel or housing 51 is pivotally mounted within housing 1 by a bolt 81 carried through housing 51 and through holes in the top and bottom walls 15 and 13 of housing 1. A pair of flanges 83 and 85 prevent vertical movement of housing 51 but permit this housing to be rotated about bolt 81 to provide access both to the openings in the back wall of this housing and to the electrical components (shown in FIG. 11) which are mounted on a board 87 secured to the back wall 17.

As noted above, one feature of the present invention is to provide a teaching machine in which the subject matter to be taught may be readily and economically varied. This subject matter in the specific embodiment disclosed herein consists of a group of electronic symbols. These symbols are inscribed upon slips or cards of tracing paper or acetate film indicated at 89. Strips 89 also carry, immediately to the right of the symbols, indicia which explain or name these symbols. A second series of strips 91 are received in the pockets to the right of the inner panel. These strips also carry indicia which explain the various electronic symbols shown on strips 89. The pocket formed at the top of panel 51 receives a strip of paper or film 93 which identifies the subject matter to be taught; a pocket to the left of film strip 93 receives a strip 95 having an X thereon; a pocket to the right of film strip 93 receives a strip having a check mark (√) thereon; and a pocket immediately below strip 93 receives a strip 99 having two indicia, "START" and "ALL OK," thereon. Strips 89, 91 and 93 are removable so that the subject matter to be taught may be readily varied. Conversely, strips 95, 97 and 99 are permanently positioned within their respective pockets. Also, the sheets of material in front of strips 95, 97 and 99 are not transparent so that the indicia inscribed on these strips is visible only when the respective lamps behind them are lit.

When front panel 23 is in its closed position, the teaching machine presents a first series of question representations (the electronic symbols) through windows 31a; a second series of explanation representations (the names of these symbols) through windows 31b; and a third series of response representations (which also name the electronic symbols) through windows 31c. The names of the symbols appearing through apertures 31c are presented visually at random with respect to the representations presented through apertures 31a and 31b. The sequence of representations in the third series with respect to those in the second series is interrelated with the programming of the electrical control portion of the teaching machine described in detail hereinafter.

Figure 10:
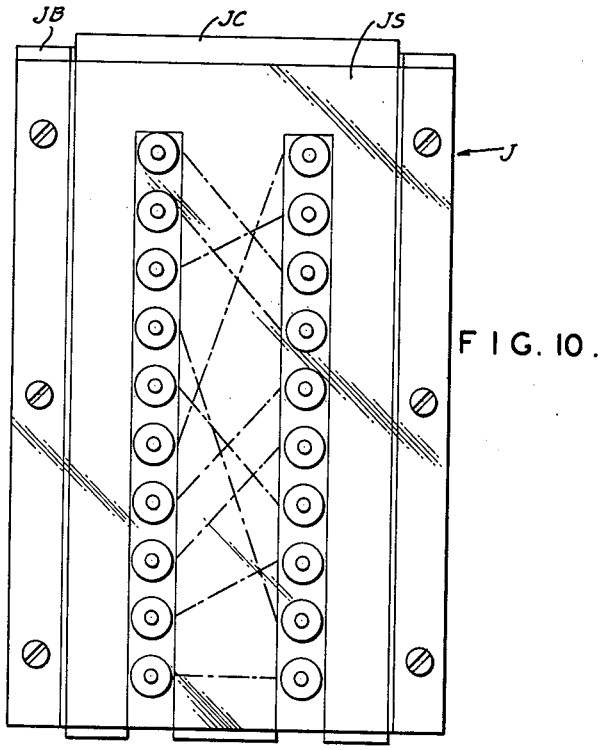
FIG. 10 is an enlarged view of a terminal board employed in programming and FIG. 1 teaching machine.
Figure 11:
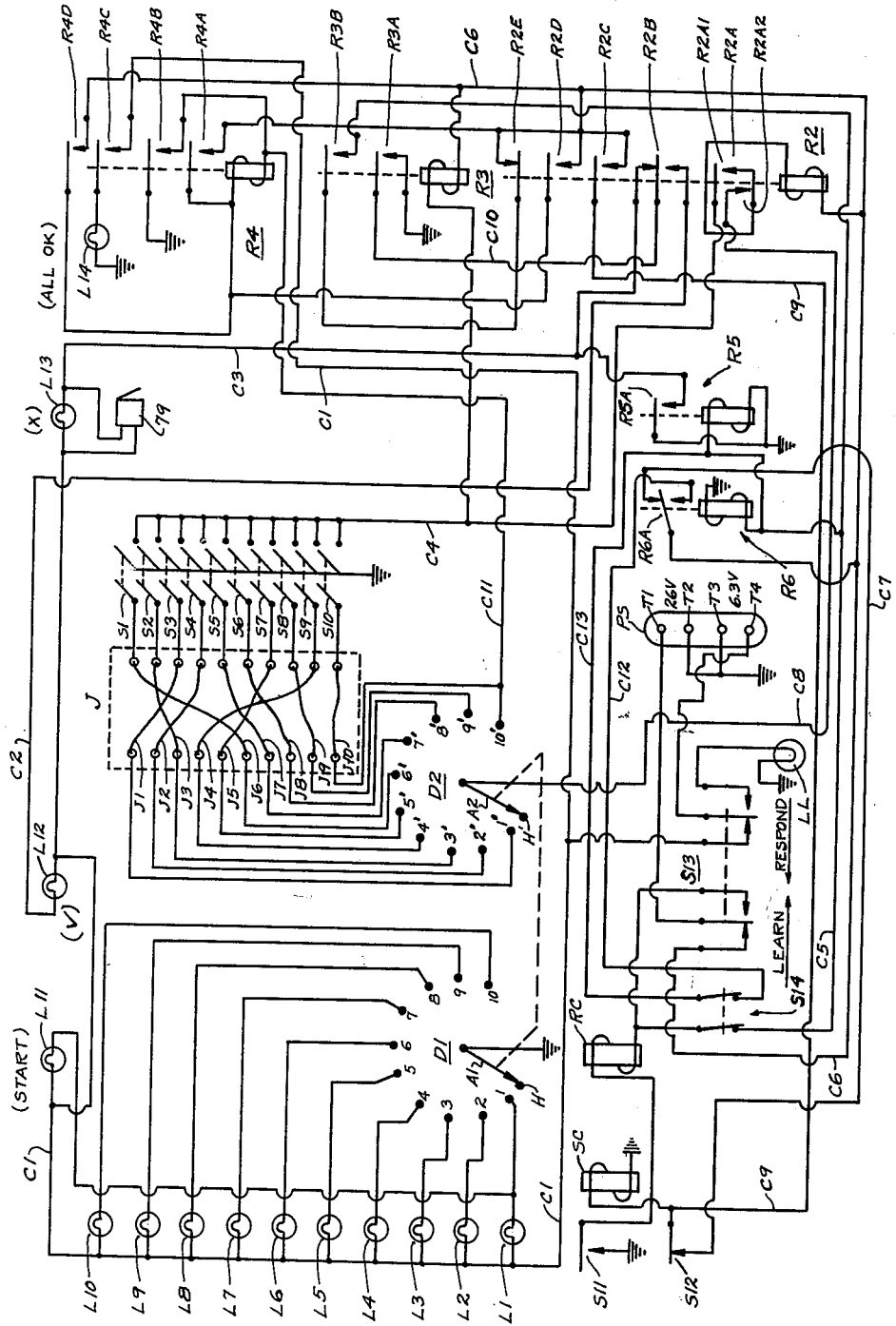
FIG. 11 is a circuit diagram illustrating the electrical components of the FIG. 1 teaching machine and their interconnection.

The electrical components of the teaching machine and their interconnection are illustrated schematically in FIG. 11. In the interest of clarity these components (except for switches S1–S10, lamps L, and the jack-strip which is detailed in FIG. 10 discussed hereinafter) are not shown in FIGS. 1–10 which illustrate the mechanical details of the teaching machine. All of these components, with the exception of switches S1–S10 and lamps L, are mounted on board 87 in the back of housing 11. Referring now to FIG. 11, the electrical control circuit comprises a stepping switch which includes two portions or decks D1 and D2, a stepping coil SC and a reset coil RC. Deck D1 has a movable arm or rotor A1 which selectively contacts a plurality of contacts 1 through 10 and H. Similarly, deck D2 has a movable contact arm or rotor A2 which selectively contacts a plurality of contacts 1' through 10' and H'. When arms A1 and A2 contact respective terminals H and H' they will be said to be in their home position. Arms A1 and A2 are stepped from one contact to the next (clockwise) each time stepping coil SC is energized. Arm A1 is ganged with arm A2 for movement therewith so that when arm A1 contacts terminal H, arm A2 contacts terminal H' and so on. The stepping switch also includes two switches S11 and S12. Switch S11 is controlled by the stepping switch to be open when the arms of this switch are in their home position, but to close in all other positions of these arms. Conversely, switch S12 is closed when these arms are in their home positions, and open at all other times. Upon energization of reset coil RS, arms A1 and A2 are stepped around from whatever position they may be in to their respective home positions.

The control circuit of FIG. 11 further includes a D.C. power supply PS which supplies two levels of regulated D.C. power, 26 v. D.C. between terminals T1 and T2 and 6.3 v. D.C. between terminals T3 and T4. Terminals T2 and T3 are connected to ground as indicated. This power supply is preferably a rectifier type supply which rectifies 115 v. A.C. to provide the two levels of D.C. A selector switch S13 having two arms and two sets of contacts is provided. This switch has a first or learn position wherein the arms of the switch are moved to the right, and a second or respond position wherein these arms are moved to their respective left positions. Switch S13 is controlled by lever 43; it is in its learn position when this lever positions shutter 33 to mask apertures 31c, and is in its respond position when shutter 33 is positioned to mask apertures 31b. A double-pole, single-throw switch S14 is also included. As explained hereinafter, there are two modes of operation of the teaching machine and this switch provides a means of selecting one or the other of these modes.

Five relays R2 through R6 are provided to control the actuation of the various other electrical components during the operation of the teaching machine. Relay R2 includes five sets of contacts R2A–R2E; relay R3 includes two sets of contacts R3A and R3B; relay R4 includes four sets of contacts R4A–R4D; relay R5, one set of contacts R5A; and relay R6 includes one set of contacts R6A. Contacts R2A are so called "make-before-break" contacts, i.e., upon energization of the coil of relay R2, contacts R2A1 close before contacts R2A2 open. All of the contacts are shown in their normal positions in FIG. 11; i.e., the positions they assume when their respective coils are deenergized.

A plurality of lamps L1–L10 are connected between a conductor C1 and respective contacts of deck D1. One of these lamps is positioned behind each of the electronic symbols of the question representations. Four additional lamps L11–L15 are included in the FIG. 11 circuit. Lamp L11 is positioned behind the word "START" and is connected between conductor C1 and contact 1; lamp L12 is positioned behind the check-mark strip 95 and connected between conductor C1 and a conductor C2; lamp L13 is positioned behind the X-mark strip 97 and connected between conductor C1 and a conductor C3; and lamp L14 is positioned between the "ALL OK" indication on strip 99 and connected between one of the contacts of switch R4D and ground. Buzzer 79 is connected in parallel with lamp L13.

Switches S1–S10 are connected between a conductor C4 and respective jacks or terminals of a program constituted by a terminal board or jack-strip J. These switches are double-pole momentary-contact push-button switches having a center contact connected to ground. A second set of jacks or terminals of jack-strip J are connected to respective contacts of deck D2. The terminals of this jack-strip are interconnected by conductors jumpers J1–J10. Jack-strip J may be a patch board of the type employed in programming analog computers. The pattern of the interconnections of the terminals of board J coincides with the sequence of the response representations with respect to the question representations. Thus, since the first electrical symbol, the crystal diode, is named or explained by the third representation in the response column, jumper J1 interconnects the first terminal in the row on the left of the jack-strip J with the third terminal in the row on the right of this strip. This interconnects contact 1' with switch S3. Similarly, since the second of the question representations, the symbol for a switch, is explained by the fourth representation in the response column, jumper J2 interconnects contact 2' with switch S4. This pattern is continued until all of the contacts of deck D2 (which correspond in order to the question symbols) are connected to an appropriate switch S1–S10 (which correspond in order to the response representations).

In order that the teaching machine may be readily programmed by nontechnical personnel, jack-strip J has a pocket therein formed by a sheet of transparent material JS secured to the front of an insulated base JB (see FIG. 10). The terminals of strip J are carried through this transparent sheet. For each sequence of the response representations with respect to the question representations, a guide or programming card JC is provided having thereon the pattern of the jumpers J1–J10 which will properly program the machine. After this card is inserted in place, the operator merely has to interconnect the terminals as indicated by the lines on the guide card.

The operation of the teaching machine is as follows: The three series of representations are placed in their respective pockets and jack-strip J is programmed in accordance with the sequence of the question series with respect to the sequence of the response series of representations. The student operating the machine actuates lever 43 to its learn position thereby moving shutter 33 to the right (as viewed in FIG. 1), exposing the question and answer representations, and masking the response representations. Since an explanation of each of the symbols to be taught is visually coded with each symbol, i.e., appears immediately adjacent each symbol, the student is given an opportunity of learning the meaning of these symbols. After he feels he has mastered the symbols, or alternatively after a preselected time interval, he actuates lever 43 to its response position. This masks apertures 31b and uncovers the representations behind apertures 31c. In this position of shutter 33, the student is presented with the various symbols and with a number of responses which are presented visually at random with respect to these symbols. Upon initial actuation of lever 43 to its response position, the lights behind all but the first of the question representations are dark, and all the lights behind the response indications are lit. The light behind "START" is also lit upon actuation of lever 43. The student is then tested as to what he has learned. He responds by pushing a button adjacent the response indication that he feels matches the material in the question window that is lit. If his response is correct, the light behind the check mark (√) lights, the light behind the first question goes out and the subsequent question window is lit. If on the other hand the student's response is incorrect, the X lamp lights, buzzer 79 is energized, and all question windows go dark. After an incorrect response, in order to continue, the student must return the control lever to its learn position, thus uncovering the test material again and providing the student with an opportunity to discover his mistake. When the student feels that he is again ready to test himself, he returns the control lever to the respond position and repeats the testing procedure. This mode of operation of the teaching machine is called a "repeat" mode since the student cannot proceed after making an incorrect response. If desired, the machine may be operated in a "continue" mode wherein, if a mistake occurs, the X lamp lights, the buzzer sounds, but the question window remains lit until the correct response button is pressed. As explained hereinafter, the setting of switch S14 determines the mode in which the machine is operated. For most applications the repeat mode is preferred since in this mode, the factor of making the student start again after making a mistake reinforces the learning processes by repetition. In the repeat mode, the items presented early in the series by the machine should be the most important. In either mode, when the student has proceeded through all ten responses correctly, the "ALL OK" lamp lights and the program is finished and ready for the next student.

The electrical control circuit of FIG. 11 provides the sequence of operations outlined above as follows: It will be assumed that switch S14 is in the closed position illustrated, thereby setting the machine in its repeat mode. All of the lamps which are to be lit when lever 43 is actuated to its learn position are indicated at LL. These include lamps behind all of the question representations (in addition to lamps L1–L10) and the lamps behind the explanation windows. When control lever 43 is actuated to its learn position, lights LL are energized by a circuit from terminal T4 through the right switch portion of switch S13, through the lamps LL to ground. If at the time switch S13 is moved to its learn position, arms A1 and A2 are not in their respective home positions, a circuit from terminal T1 is completed which energizes reset coil RC. This circuit may be traced from terminal T1, through the left portion of switch S13, through reset coil RC, and switch S11 to ground. The energizing of this coil causes arms A1 and A2 to be stepped around to their respective home positions. In these positions, switch S11 is open, deenergizing reset coil RS. Actuation of switch S13 to its learn position also completes a circuit which energizes relays R5 and R6. This circuit may be traced from terminal T1, through the left portion of switch S14, through the left portion of switch S14 to a conductor C5, through the coils of relay coils R5 and R6 to ground. As explained hereinafter, the energizing of these relays R5 and R6 which in combination with reset coil RS constitute a disabling means prevents actuation of any of lights L1–L10 or the stepping coil SC. With switch S14 in its repeat position, these relays are energized (1) when switch S13 is placed in its learn position and (2) when switch S13 is in its respond position upon actuation of an incorrect response by the student operator.

When lever 43 is placed in its respond position, switch S13 is actuated to its respond position, i.e., the arms of this switch are moved to the position illustrated in FIG. 11. This deenergizes the coils of relays R5 and R6 and also deenergizes the lights LL. The lights behind the response windows 31c are continuously energized by power supply PS, and accordingly are not shown in the control circuit of FIG. 11. The placing of switch S13 in its respond position energizes stepping coil SC thereby causing arms A1 and A2 to be stepped out of their home positions and into contact with terminals 1 and 1', respectively. The circuit for energizing coil SC may be traced from terminal T1, through the left portion of switch S13 to a conductor C6, through contacts R6A to a conductor C7, through switch S12, and through coil SC to ground. As arms A1 and A2 move out of their home positions, switch S12 opens, disconnecting conductor C7 from coil SC. Stepping of arm A1 to contact terminal 1 completes a circuit from terminal T4 through switch S13 to conductor C1, and thereby energizes lights L1 and L11.

The light behind the first question window is thus lit and the machine is ready for the student to respond by pressing one of the push buttons S1–S10. If the student's response is correct (in this case if he actuates switch S3), circuits are completed which energize the coils of relay R2 and relay R3. The circuit which energizes the coil of R2 may be traced from conductor C6 which is at a 26 v. D.C. level, through the coil of relay R2, the contact R2A2, a conductor C8, arm A2, contact 1', jumper J1, and switch S3 to ground. The circuit which energizes relay coil R3 is completed from conductor C6 through this coil to conductor C4 which is connected to ground by switch S3. The energizing of relay R2 closes contacts R2C which completes a circuit from conductor C6 through these contacts to a conductor C9 to energize stepping coil SC, and thereby step arms A1 and A2 to contacts 2 and 2'. The energizing of relays R2 and R3 also completes a circuit from conductor C1, through light L12 to conductor C2, through contacts R2B, a conductor C10, and contacts R3A to ground. This energizes the light behind the check mark. The opening of contacts R2E prevents the energization of either relay R5 or R6 (which as pointed out above, should only be energized on the occurrence of an incorrect response).

As arms A1 and A2 are moved to contacts 2 and 2', relays R2 and R3 are deenergized and the circuit is conditioned for the next response. If this second response is correct, relays R2 and R3 are again energized, lighting light L12 and energizing coil SC to step the arms to their next position or contact. This sequence continues as long as the student continues to respond correctly as question windows are subsequently and sequentially lit. When the tenth correct response is made by the student, relays R2, R3 and R4 are all energized; relays R2 and R3 as before, and relay R4 from conductor C6, through contacts R2D to the coil of R4, from this coil to a conductor C11, through jumper J10 and switch S10 to ground. The energizing of relay R4 completes a holding circuit for this relay through contacts R4A and R4D, and also lights a light L14 behind the "ALL OK" window through contacts R4C. The energizing of relays R2 and R3 steps arms A1 and A2 from positions 10 and 10' to positions H and H', respectively, and the testing or respond cycle is completed. In order to initiate another cycle, lever 43 must again be moved to its learn position. This again uncovers the explanation representations in windows 31b and masks those of windows 31c, setting the machine up for the next student.

With switch S14 in the repeat position shown, if an incorrect response is made by the student, the X lamp lights, buzzer 79 sounds and all the question windows go dark. This is accomplished as follows: Assuming the student has proceeded to a point, for example, where arms A1 and A2 contact terminals 3 and 3', respectively, if the student then chooses an incorrect response, say by pushing switch S4 instead of switch S2, relay R3 is energized but relay R2 is not energized. The circuit for relay R3 is again completed from line C6 through the coil R3 to line C4 which is connected to ground upon actuation of any of the push-buttons S1–S10. Since relay R2 is not energized, stepping coil SC cannot be energized as before, but instead, the coils of relays R5 and R6 are energized. Energizing of relay R5 causes contacts R5A to close and thereby lights light L13 and energizes buzzer 79. A holding circuit for relays R5 and R6 (which in the FIG. 11 circuit function as a single relay) is completed from line C6 through contacts R6A, a conductor C12, the right contacts of switch S14, conductor 13, and the respective coils of relays R5 and R6 to ground. The closing of contacts R6A completes a circuit for the reset coil RC from line C6, through contacts R6A, line C12, switch S14 (right side) a conductor C13, conductor C5, switch S14 (left side) reset coil RC, and switch S11 to ground. This steps arms A1 and A2 to their respective home positions. In these positions lever 43 must again be actuated to the learn position in order for the student to continue.

The opening of switch S14 establishes the "continue" mode of operation for the machine, as explained above. The opening of this switch interrupts the holding circuit for relays R5 and R6 and also prevents the energization of reset coil RC. With the switch in this position, an incorrect response energizes relays R5 and R6 thereby lighting light L13 and causing buzzer 79 to sound, but because the stepping coil is not energized, the student may continue until a correct response to the question is found.

While the testing machine of this invention is specifically illustrated as being employed to teach the meaning of various electronic symbols, it will be understood that this machine could be employed in any area or in connection with any subject as to which matching-type tests are possible, and that therefore there are an almost unlimited number of possible applications for this machine. It might be used, for example, in industrial education classes to each tool identification; or in foreign language classes to teach vocabulary; or in mathematics to teach the steps in the solution of a problem; etc. Since the material to be taught can be hand lettered, typed or otherwise placed on the small translucent cards or sheets of tracing paper or acetate film held behind the various windows, an instructor can readily and economically vary the material to be taught and accordingly one teaching machine could serve many classes. For every sequence of question representations with respect to response representations, a programming card JC may be provided, thereby making the programming of the machine straightforward; offering little difficulty even to an instructor with a non-technical background. This latter feature makes it possible to change the pattern of responses so that a student operator will not be able to associate a particular response window with a certain question window. Moreover, because the teaching machine disclosed herein is easily assembled, it might be supplied in "kit" form to be assembled by the students themselves who will ultimately use the machine in their classes. This would not only bring the machine within the financial reach of most schools, but also give the students, for example of industrial-education classes, an opportunity to build and perhaps modify a practical electrical control circuit.

In order to provide an additional signal of a correct response by a student, a chime could be incorporated into the teaching machine, connected in parallel with lamp L12. This chime would be energized each time a correct response is made. If desired, this chime could be a typical front-door, back-door type chime, in which case it could be interconnected with lamp L14 to produce an additional note when the student has correctly responded to all the questions. Also a timer could be incorporated into the teaching machine to allow the student a certain amount of time in which to respond to each question. After this predetermined time interval, if the student has not made a response, the timer would function to disable the machine, for example by energizing the coils of relays R5 and R6 and reset coil RS.

In view of the above, it will be seen that the several objects of the invention are achieved and other advantageous results obtained.

As various changes could be made in the above constructions without departing from the scope of the inven-

What is claimed is:

1. A teaching machine comprising a panel having thereon a first series of representations of items to be taught, a second series of representations in explanation of the items of the first series and visually coded therewith, and a third series of representations corresponding to the second series but presented visually at random relative to the first and second series; masking means shiftable between a learn position exposing said first and second series and masking said third series and a respond position exposing said first and third series and masking said second series; a plurality of switches, one associated with each representation of said third series; indicating means; control means comprising an electric circuit including program means for interconnecting said switches in said circuit in accordance with the sequence of representations in said third series relative to the sequence of representations in said first series; and means responsive to shifting of said masking means into its respond position for energizing said control means whereby the indicating means is energized when said switches are actuated in a sequence which matches the representations of said first series with the representations of said third series.

2. A teaching machine as set forth in claim 1, further including a plurality of electrical signal means, one associated with each representation of said first series, and wherein said control means includes a stepping switch interconnected in said electrical circuit with said switches for sequentially energizing said electrical signal means whereby said signal means are sequentially energized as long as said plurality of switches are actuated in a sequence which matches the representations of said first series with the representations of said third series.

3. A teaching machine as set forth in claim 2 wherein said program means includes a terminal board and a plurality of conductors interconnecting the terminals of said board, the pattern of said interconnections determining the programming of said control means.

4. A teaching machine as set forth in claim 3 wherein said terminal board has a pocket therein for receiving a card carrying indicia thereon which indicate the pattern of said interconnections to properly program said machine.

5. A teaching machine as set forth in claim 2, further including an additional signal means, and wherein said control means energizes this additional signal means upon actuation of one of said switches in a sequence which does not match the representations of said first series with the representations of said third series.

6. A teaching machine as set forth in claim 1, further including means for indicating when all of said switches have been actuated in a sequence to match all of the representations of said first series with the representations of said third series.

7. A teaching machine as set forth in claim 1 wherein said control means includes means operative when said masking means is in its respond position for preventing further operation of said machine upon the actuation of one of said switches in a sequence which does not match the representations of said first series with the representations of said third series.

8. A teaching machine as set forth in claim 2 wherein said control means includes means adapted when energized to disable said stepping switch and thereby prevent further operation of said machine, and switch means which in a first position causes said disabling means to be energized when one of said switches is actuated in a sequence which does not match the representations of said first series with the representations of said third series, and which in a second position prevents energization of said disabling means so long as said shutter is in its respond position, whereby the position of said switch means establishes the mode of operation of said machine.

9. A teaching machine as set forth in claim 2 wherein said stepping switch includes a reset coil, and wherein said control means includes means for energizing said coil upon the shifting of said masking means to its learn position whereby the shifting of said masking means to its learn position causes said machine to be reset.

10. A teaching machine as set forth in claim 1 wherein said plurality of switches are momentary-contact pushbutton switches.

11. A teaching machine comprising a panel having therein a plurality of question windows, a plurality of explanation windows, and a plurality of response windows; means positioned behind said panel and holding a first series of representations of items to be taught behind said question windows, a second series of representations in explanation of the items of the first series behind said explanation windows, and a third series of representations corresponding to the second series behind said response windows, the sequence of representations in said first and second series placing an explanation of each item in said first series immediately adjacent each item in said first series so as to be visually coded therewith, the sequence of representations in said third series being presented visually at random with respect to said first and second series; a shutter movable by a control lever from a learn position wherein said first and second series are presented through said question and explanation windows respectively and said third series is masked to a respond position wherein said first and third series are presented through said question and response windows respectively and said second series is masked; a plurality of switches mounted on said panel, one positioned adjacent each of said response windows; a plurality of signal lamps, one positioned behind each of said representations; indicating means; control means comprising an electric circuit including program means for interconnecting said switches in said circuit with said signal lamps in accordance with the sequence of representations in said third series relative to the sequence of representations in said first series; and means responsive to shifting of said shutter into its respond position for energizing said control means whereby the indicating means is energized when said switches are actuated in a sequence which matches the representations of said first series with the representations of said third series.

12. A teaching machine as set forth in claim 11 wherein said means holding said first, second and third series of representations is an inner panel having a plurality of pockets for holding translucent cards carrying said representations, and wherein said plurality of signal lamps are positioned within said inner panel, one behind each of said representations.

13. A teaching machine as set forth in claim 12 wherein said shutter comprises a sheet of opaque material having an aperture therein, said sheet being positioned between said first-mentioned panel and said inner panel.

14. A teaching machine as set forth in claim 11 wherein said control means includes a stepping switch having a plurality of contacts connected by means of said electrical circuit respectively to one of said signal lamps behind each of said first series of representations, a movable arm which selectively contacts one of said contacts to energize the associated signal lamp and a stepping coil adapted when energized to step said arm from one contact to the next contact, said program means being operative when said control lever is in its respond position for sequentially energizing said stepping coil to thereby sequentially and individually energize the signal lamps behind said first series so long as said plurality of switches are actuated in a sequence which matches the representations of said first series with the representations of said third series.

15. A teaching machine as set forth in claim 14 wherein said stepping switch further includes a second plurality of contacts and a second movable arm adapted to be stepped by said stepping coil to selectively contact one of said second plurality of contacts, and wherein said program means includes a terminal board having a first set of terminals connected respectively to each of said second plurality of contacts and a second set of terminals connected respectively to each of said plurality of switches, and a plurality of conductors interconnecting each terminal of said first set with a terminal of said second set, the pattern of said interconnections determining the programming of said control means.

16. A teaching machine as set forth in claim 15, wherein said terminal board has a pocket therein for receiving a card carrying indicia thereon which indicate the pattern of said interconnections to properly program said machine.

17. A teaching machine as set forth in claim 14 wherein said teaching machine includes a correct-response indicating means and an incorrect-response indicating means, and wherein said control means circuit includes means for energizing said correct-response indicating means when one of said plurality of switches is actuated to match correctly a representation in said third series with the representation in said first series behind which a signal lamp is lit, and said circuit further includes means for energizing said incorrect-response indicating means when one of said switches is actuated which does not correctly match a representation in said third series with the representation in said first series behind which a signal lamp is lit.

18. A teaching machine as set forth in claim 11, further including an all-correct indicating means, and wherein said control means circuit includes means for energizing said all-correct indicating means when all of said plurality of switches have been actuated in a sequence to match all of the representations of said first series with the representations of said third series.

19. A teaching machine as set forth in claim 11 wherein said plurality of switches are momentary-contact, pushbutton type switches, and wherein said signal lamps are incandescent lamps.

20. A teaching machine as set forth in claim 14 wherein said control means circuit includes means for disabling said stepping switch when one of said switches is actuated which does not correctly match a representation in said third series with the representation in said first series behind which a signal lamp is lit.

21. A teaching machine as set forth in claim 14 wherein said control means circuit includes means adapted when energized to disable said stepping switch and thereby prevent further operation of said machine, and switch means which is a first position causes said disabling means to be energized when one of said switches is actuated which does not correctly match a representation in said third series with the representation in said first series behind which a signal lamp is lit, and which in a second position prevents energization of said disabling means so long as said shutter is in its respond position, whereby the position of said switch means establishes the mode of operation of said machine.

22. A teaching machine as set forth in claim 15 wherein said stepping switch includes a reset coil adapted when energized to step said first and second movable arms to home positions, and wherein said control means circuit includes means for energizing said reset coil upon actuation of said control lever to its learn position, whereby the actuation of said control lever to its learn position causes said teaching machine to be reset.

References Cited in the file of this patent

UNITED STATES PATENTS

| | | |
|---|---|---|
| 1,881,242 | Prentice | Oct. 4, 1932 |
| 2,104,718 | Dougherty | Jan. 4, 1938 |
| 2,402,162 | Holt | June 18, 1946 |
| 2,503,130 | Poritz | Apr. 4, 1950 |
| 2,877,568 | Beshard et al. | Mar. 17, 1959 |
| 2,947,087 | Arnold | Aug. 2, 1960 |
| 2,983,053 | Bartholmew | May 9, 1961 |
| 3,052,041 | Luxton et al. | Sept. 4, 1962 |
| 3,100,352 | Boissevain | Aug. 13, 1963 |